(12) United States Patent
Lake (10) Patent No.: US 7,794,346 B2
(45) Date of Patent: Sep. 14, 2010

(54) TORQUE TRANSFER DEVICE

(76) Inventor: William Lake, W20298 State Rd. 121, Whitehall, WI (US) 54773

( * ) Notice: Subject to any disclaimer, the term of this patent is extended or adjusted under 35 U.S.C. 154(b) by 154 days.

(21) Appl. No.: 12/024,138

(22) Filed: Feb. 1, 2008

(65) Prior Publication Data

US 2009/0193914 A1    Aug. 6, 2009

(51) Int. Cl.
F16H 7/00 (2006.01)
F16H 7/24 (2006.01)
(52) U.S. Cl. .................. 474/150; 474/149; 474/148
(58) Field of Classification Search .............. 474/29, 474/62, 53, 31, 70; 74/89.21, 89.2, 68, 67
See application file for complete search history.

(56) References Cited

U.S. PATENT DOCUMENTS

| | | | | |
|---|---|---|---|---|
| 93,004 A * | 7/1869 | Read | ...................... | 74/67 |
| 168,575 A * | 10/1875 | McClosky | ...................... | 74/67 |
| 190,594 A * | 5/1877 | Janssen | ...................... | 474/67 |
| 229,875 A * | 7/1880 | Dixon | ...................... | 74/67 |
| 238,839 A * | 3/1881 | Bond, Jr. | ...................... | 74/67 |
| 265,260 A * | 10/1882 | Holcombe | ...................... | 74/65 |
| 317,093 A * | 5/1885 | Colman | ...................... | 74/67 |
| 373,525 A * | 11/1887 | Grout et al. | ...................... | 74/67 |
| 380,879 A * | 4/1888 | Field | ...................... | 105/49 |
| 386,027 A * | 7/1888 | Pitt | ...................... | 74/68 |
| 480,166 A * | 8/1892 | Battersby | ...................... | 280/262 |
| 527,671 A * | 10/1894 | Devoll | ...................... | 74/67 |
| 544,685 A * | 8/1895 | Porter | ...................... | 74/67 |
| 567,155 A * | 9/1896 | McIntire | ...................... | 280/261 |
| 616,665 A * | 12/1898 | Hartzell | ...................... | 74/67 |
| 617,631 A * | 1/1899 | Bosch | ...................... | 280/260 |
| 630,093 A * | 8/1899 | Noar | ...................... | 74/67 |
| 648,865 A * | 5/1900 | Ganz | ...................... | 74/68 |
| 669,879 A * | 3/1901 | Ganz | ...................... | 280/260 |
| 1,854,566 A * | 4/1932 | Spiro | ...................... | 343/702 |
| 1,887,633 A * | 11/1932 | Geiger | ...................... | 60/616 |
| 2,223,386 A * | 12/1940 | Richardson | ...................... | 105/37 |
| 2,368,813 A * | 2/1945 | Everitt | ...................... | 33/441 |
| 2,659,285 A * | 11/1953 | Burr | ...................... | 172/42 |
| 2,928,516 A * | 3/1960 | Bennett | ...................... | 192/138 |
| 3,556,283 A * | 1/1971 | Brundage et al. | ...................... | 198/460.1 |
| 3,583,535 A * | 6/1971 | Plamper | ...................... | 192/219 |
| 3,596,563 A * | 8/1971 | Buck | ...................... | 91/232 |
| 3,662,584 A * | 5/1972 | Jones et al. | ...................... | 72/411 |
| 3,670,902 A * | 6/1972 | Kaplan | ...................... | 414/746.6 |
| 3,728,923 A * | 4/1973 | Lanore | ...................... | 83/318 |
| 3,774,390 A * | 11/1973 | Dauvergne | ...................... | 60/614 |
| 4,029,334 A * | 6/1977 | Trammell, Jr. | ...................... | 280/261 |
| 4,062,246 A * | 12/1977 | Lukawsky | ...................... | 74/88 |
| 4,134,307 A * | 1/1979 | Nilsson | ...................... | 74/66 |
| 4,154,305 A * | 5/1979 | Prewett | ...................... | 172/21 |

(Continued)

Primary Examiner—John Q Nguyen
Assistant Examiner—Henry Liu (57) ABSTRACT

A torque transfer device for efficiently increasing the torque transferred from a drive unit to another device (e.g. transmission, sprocket, etc.). The torque transfer device generally includes a drive unit, a first rotating member rotatably attached to the drive unit, wherein the drive unit rotates the first rotating member, a receiving unit, a first rotating member rotatably attached to the receiving unit and a connecting arm attached to a first attachment point of the first rotating member and a second attachment point of the second rotating member. The first attachment point is offset from a first rotational axis of the first rotating member and the second attachment point is offset from a second rotational axis of the second rotating member.

7 Claims, 9 Drawing Sheets

U.S. PATENT DOCUMENTS

| | | | | |
|---|---|---|---|---|
| 4,363,299 A * | 12/1982 | Bristol | ............... | 123/197.3 |
| 4,388,073 A * | 6/1983 | Klenk | ............... | 493/444 |
| 4,520,563 A * | 6/1985 | Marceau | ............... | 30/122 |
| 4,568,319 A * | 2/1986 | Samata | ............... | 474/148 |
| 4,606,411 A * | 8/1986 | Classen | ............... | 172/22 |
| 4,606,412 A * | 8/1986 | Classen | ............... | 172/22 |
| 4,614,290 A * | 9/1986 | Boss | ............... | 227/1 |
| 4,635,861 A * | 1/1987 | Resch | ............... | 241/37 |
| 4,664,213 A * | 5/1987 | Lin | ............... | 180/212 |
| 4,791,945 A * | 12/1988 | Moriyama | ............... | 15/22.1 |
| 4,843,973 A * | 7/1989 | Hartelius et al. | ............... | 105/26.1 |
| 4,884,637 A * | 12/1989 | Rohleder | ............... | 172/22 |
| 4,936,154 A * | 6/1990 | Hamlin | ............... | 74/67 |
| 5,002,296 A * | 3/1991 | Chiu | ............... | 280/260 |
| 5,085,625 A * | 2/1992 | Kojima | ............... | 493/444 |
| 5,171,204 A * | 12/1992 | Muller | ............... | 493/444 |
| 5,270,070 A * | 12/1993 | Campbell | ............... | 426/503 |
| 5,564,300 A * | 10/1996 | Mueller | ............... | 72/349 |
| 5,566,590 A * | 10/1996 | Wan | ............... | 74/594.3 |
| 6,669,619 B2 * | 12/2003 | Bialek | ............... | 493/444 |
| 7,434,442 B2 * | 10/2008 | Gombas | ............... | 72/449 |
| 2005/0192135 A1 * | 9/2005 | Kawakita | ............... | 474/29 |
| 2008/0016980 A1 * | 1/2008 | Gutierrez | ............... | 74/551.1 |

* cited by examiner

TORQUE TRANSFER DEVICE

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to drive units and more specifically it relates to a torque transfer device for efficiently increasing the torque transferred from a drive unit to another device (e.g. transmission, sprocket, etc.).

2. Description of the Related Art

Any discussion of the related art throughout the specification should in no way be considered as an admission that such related art is widely known or forms part of common general knowledge in the field.

Various torque transfer devices are commonly utilized to transfer torque from a drive unit to a receiving device. Some of these torque transfer devices may comprise a chain between the drive unit (i.e. pedals, drive sprocket) and the wheel and rear sprocket of a bicycle. Other torque transfer devices may comprise a shaft between the drive unit (i.e. engine) and transmission of a vehicle (e.g. automobile, etc.).

Many of these torque transfer devices generally lose momentum during an upward, vertical or non-powering stroke of the drive unit. This can lead to a decrease in fuel efficiency, slowing down of the vehicle or various other unintended effects. Because of the inherent problems with the related art, there is a need for a new and improved torque transfer device for efficiently increasing the torque transferred from a drive unit to another device (e.g. transmission, sprocket, etc.).

BRIEF SUMMARY OF THE INVENTION

The general purpose of the present invention is to provide a torque transfer device that has many of the advantages of the drive units mentioned heretofore. The invention generally relates to a drive unit which includes a drive unit, a first rotating member rotatably attached to the drive unit, wherein the drive unit rotates the first rotating member, a receiving unit, a first rotating member rotatably attached to the receiving unit and a connecting arm attached to a first attachment point of the first rotating member and a second attachment point of the second rotating member. The first attachment point is offset from a first rotational axis of the first rotating member and the second attachment point is offset from a second rotational axis of the second rotating member.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a torque transfer device for efficiently increasing the torque transferred from a drive unit to another device (e.g. transmission, sprocket, etc.).

Another object is to provide a torque transfer device that may be utilized between an engine and a transmission of a vehicle.

An additional object is to provide a torque transfer device that may be utilized upon a bicycle.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Turning now descriptively to the drawings, in which similar reference characters denote similar elements throughout the several views, FIGS. 1 through 9 illustrate a torque transfer device 10, which comprises a drive unit 31, a first rotating member 33 rotatably attached to the drive unit 31, wherein the drive unit 31 rotates the first rotating member 33, a receiving unit 41, a first rotating member 33 rotatably attached to the receiving unit 41 and a connecting arm 50 attached to a first attachment point 36 of the first-rotating member 33 and a second attachment point 46 of the second rotating member 43. The first attachment point 36 is offset from a first rotational axis of the first rotating member 33 and the second attachment point 46 is offset from a second rotational axis of the second rotating member 43.

B. Support Structure

The support structure 20 supports and stabilizes the rotating members 33, 43, 60, first assembly 30 and second assembly 40 while the connecting arm 50 is increasing and transferring torque from the first assembly 30 to the second assembly 40. The support structure 20 is further comprised of a rigid and strong structure to efficiently support the increased torque from the first assembly 30 to the second assembly 40. The support structure 20 may be comprised of various materials, such as but not limited to metal or plastic. The support structure 20 may also be comprised of a plurality of separable or interconnected portions wherein the first assembly 30 is connected to a first portion of the support structure 20, the second assembly 40 is connected to a second portion of the support structure 20 and the third rotating member 60 is connected to a third portion of the support structure 20.

In the preferred embodiment, the support structure 20 is comprised of a plane truss configuration as illustrated in FIGS. 1 through 4, wherein the support structure 20 includes a plurality of support members 22 crossing in a manner so as to increase the strength of the support structure 20. It is appreciated however that the support structure 20 may be comprised of various shapes or configurations all which provide for a durable and strong structure.

The support structure 20 may be mounted in various places depending on the application of the present invention. If the present invention is utilized upon an automobile to transfer and increase torque from the output portion of the engine 31 to the input portion of the transmission 41 the support structure 20 may be mounted upon the vehicle (e.g. underneath the vehicle, etc.). The present invention may also be utilized upon a bicycle to transfer and increase torque between the pedal 31 and crank mechanism and the rear wheel 41 and sprocket. In the case of the bicycle the support structure 20 may be mounted between the pedals 31 and the rear sprocket. The support structure 20 may further be mounted upon various other devices where torque is desired to be transferred and increased.

C. First Assembly

The first assembly 30 delivers the initial torque to the present invention, wherein the initial torque is increased via the present invention to be received by the second assembly 40. The first assembly 30 may be comprised of various movable structures to deliver torque. The first assembly may also include various configurations of drive units 31, such as but not limited to an engine (e.g. 4 cylinder engine, etc.) of an automobile or a pedal of a bicycle. The first assembly 30 is further preferably connected to an end of the support structure 20 as illustrated in FIGS. 1 through 5.

The first assembly 30 includes an input shaft 32 extending from the drive unit 31 (e.g. engine, pedals, etc.). The input shaft 32 preferably rotates and is connected to a first rotating member 33, wherein the input shaft 32 rotates the first rotating member 33 via the drive unit 31. The input shaft 32 is further preferably connected to the first rotating member 33 at a center axis of the first rotating member 33, wherein the first rotating member 33 and the input shaft 32 are preferably concentric.

The first rotating member 33 is preferably comprised of a circular shaped configuration as illustrated in FIGS. 1 through 4. The first rotating member 33 may further be comprised of a disc configuration or may be comprised of a sprocket configuration, wherein the first rotating member 33 may include a plurality of first teeth 34 circumscribing an outer perimeter of the first rotating member 33.

D. Second Assembly

The second assembly 40 receives the increased torque from the first assembly 40 and the connecting arm 50. The second assembly 40 may be comprised of various movable structures to receive a torque. The second assembly 40 may also include various configurations of receiving units 41, such as but not limited to a transmission of an automobile or a rear wheel of a bicycle. The second assembly 40 is further preferably connected to the support structure 20 between the first assembly 30 and the third rotating member 60 as illustrated in FIGS. 1 through 5.

The second assembly 40 includes an output shaft 42 extending from the receiving unit 41 (e.g. transmission, rear wheels, etc.). The output shaft 42 preferably rotates and is connected to a second rotating member 43. The second rotating member 43 rotates the output shaft 42, wherein the output shaft 42 is rotatably connected to the receiving unit 41. The output shaft 42 is further preferably connected to the second rotating member 43 at a center axis of the second rotating member 43, wherein the second rotating member 43 and the output shaft 42 are preferably concentric.

The second rotating member 43 is preferably comprised of a circular shaped configuration as illustrated in FIGS. 1 through 4. The second rotating member 43 is further preferably comprised of a disc configuration and further comprised of a substantially similar size as the first rotating member 33. The first rotating member 33 and the second rotating member 43 are further substantially larger than the input shaft 32 and the output shaft 42 respectively.

E. Connecting Arm

The connecting arm 50 connects the first assembly 30 to the second assembly 40 to transfer and increase the inputted torque from the first assembly 30 to the second assembly 40. The connecting arm 50 is attached to the first rotating member 33 and the second rotating member 43. The connecting arm 50 may further be attached to the third rotating member 60 as illustrated in FIGS. 1 through 5. The connecting arm 50 is comprised of a rigid and strong material, such as but not limited to metal or plastic.

The connecting arm 50 is further preferably comprised of an elongated and straight configuration. In the preferred embodiment, the connecting arm 50 is comprised of an I-shaped cross-sectional shape (similar to an I-beam); however it is appreciated that the connecting arm 50 may be comprised of various configurations rather than the preferred embodiment.

The first end 51 of the connecting arm 50 is attached to the first rotating member 33 preferably in a substantially fixed manner via a fastener 56. The second end 52 of the connecting arm 50 (opposite the first end 51) may be either attached to the second rotating member 43 via a fastener 56 or the third rotating member 60 via a fastener 56. If the third rotating member 60 is utilized, the connecting arm 50 is attached to the second rotating member 43 between the first end 51 and the second end 52, wherein a substantial longitudinal center of the connecting arm 50 is preferably attached to the second rotating member 43. The fasteners 56 may also be comprised of various configurations all which securely attach the connecting arm 50 to the rotating members 33, 43, 60, such as but not limited to bolts or various other types of fasteners.

The connecting arm 50 is further attached to the rotating members 33, 43 at an attachment point 36, 46 that is offset from the center of the rotating members 33, 43 and the concentric axis of the rotating members 33, 43 and the shafts 32, 42. The offset attachment point 36, 46 of the connecting arm 50 allows the connecting arm 50 to increase the torque transferred between the first assembly 30 and the drive unit 31 by increasing the distance between attachment point 36, 46 and the rotational center of the rotating members 33, 43 (i.e. T (torque)=F (force)×d (distance)). The ratio of input torque from the drive unit 31 to output torque to the receiving unit 41 is preferably 1 to 6; however it is appreciated that the present invention may produce various ratios of torque rather than the preferred embodiment.

Figure 2:
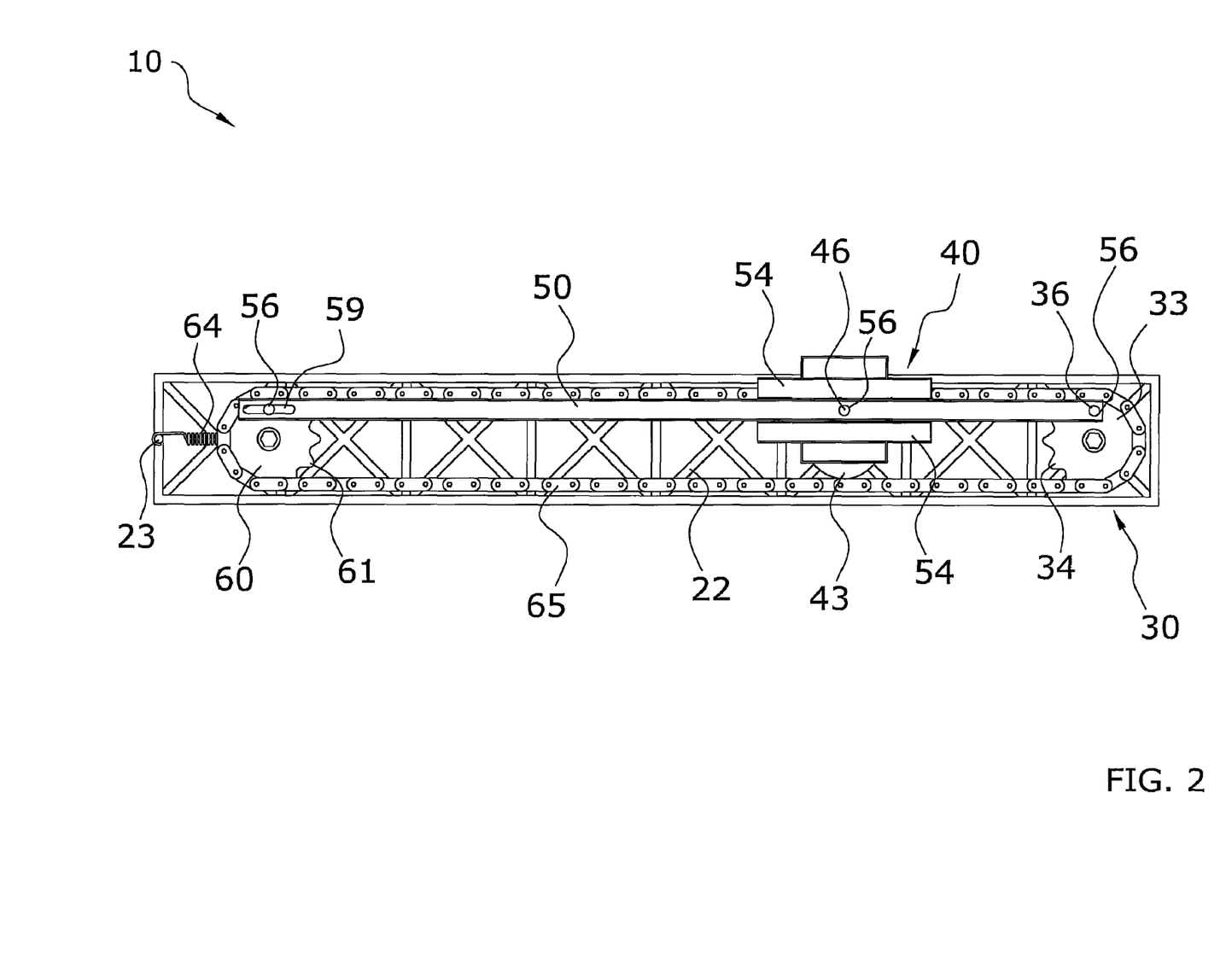
FIG. 2 is a side view of the present invention.
Figure 3:
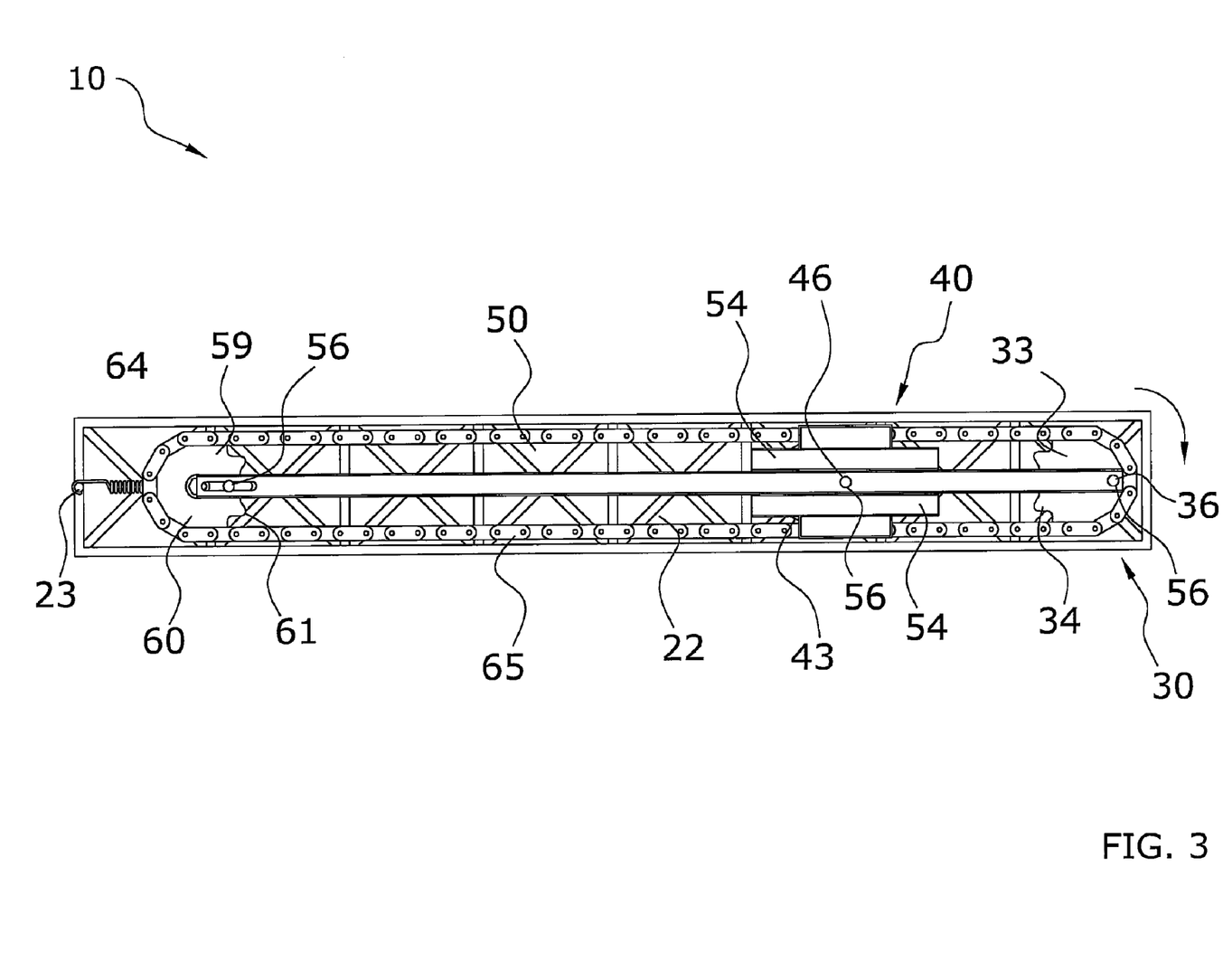
FIG. 3 is a side view of the present invention with the connecting arm in motion.
Figure 4:
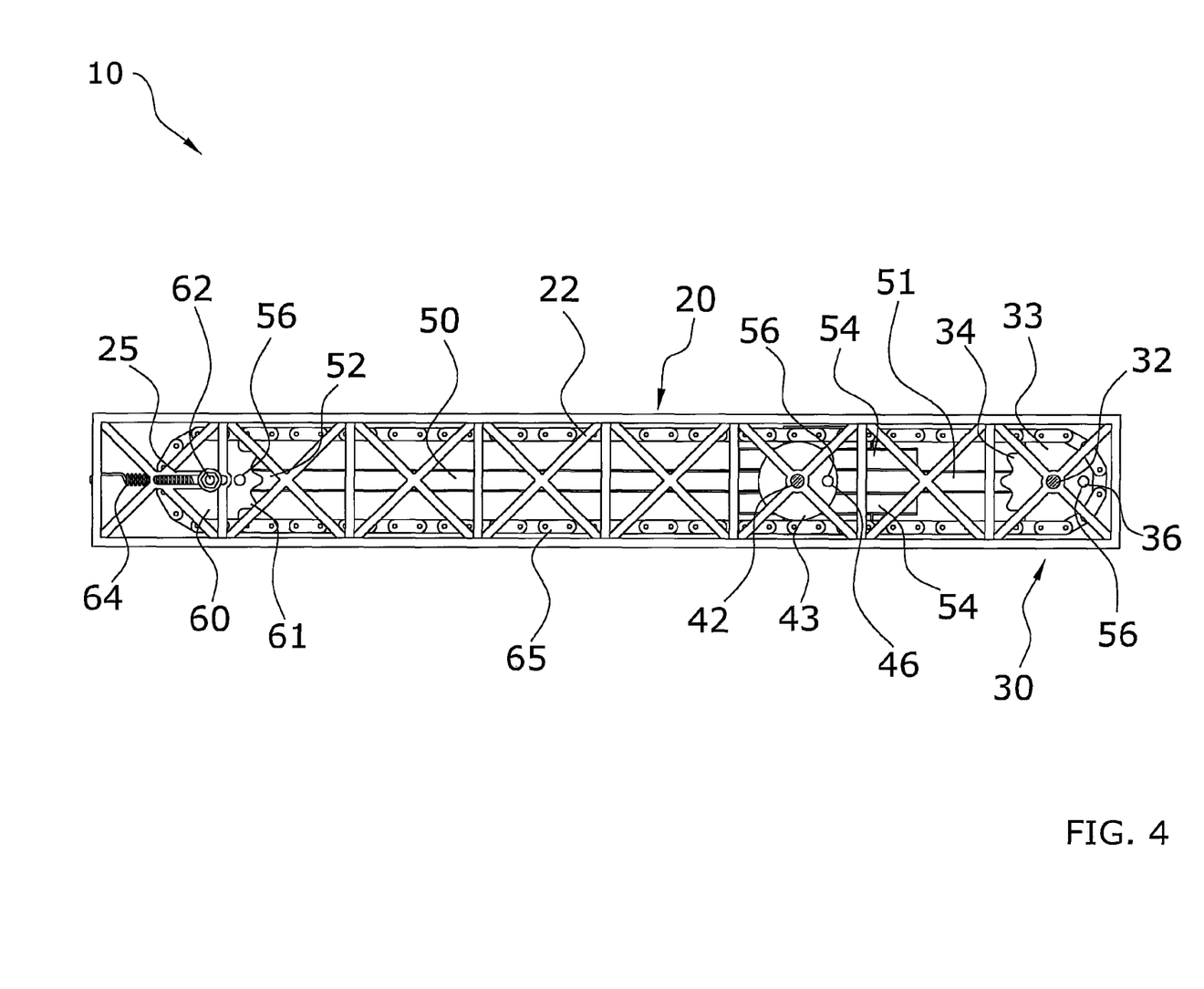
FIG. 4 is an opposite side view of the present invention.
Figure 5:
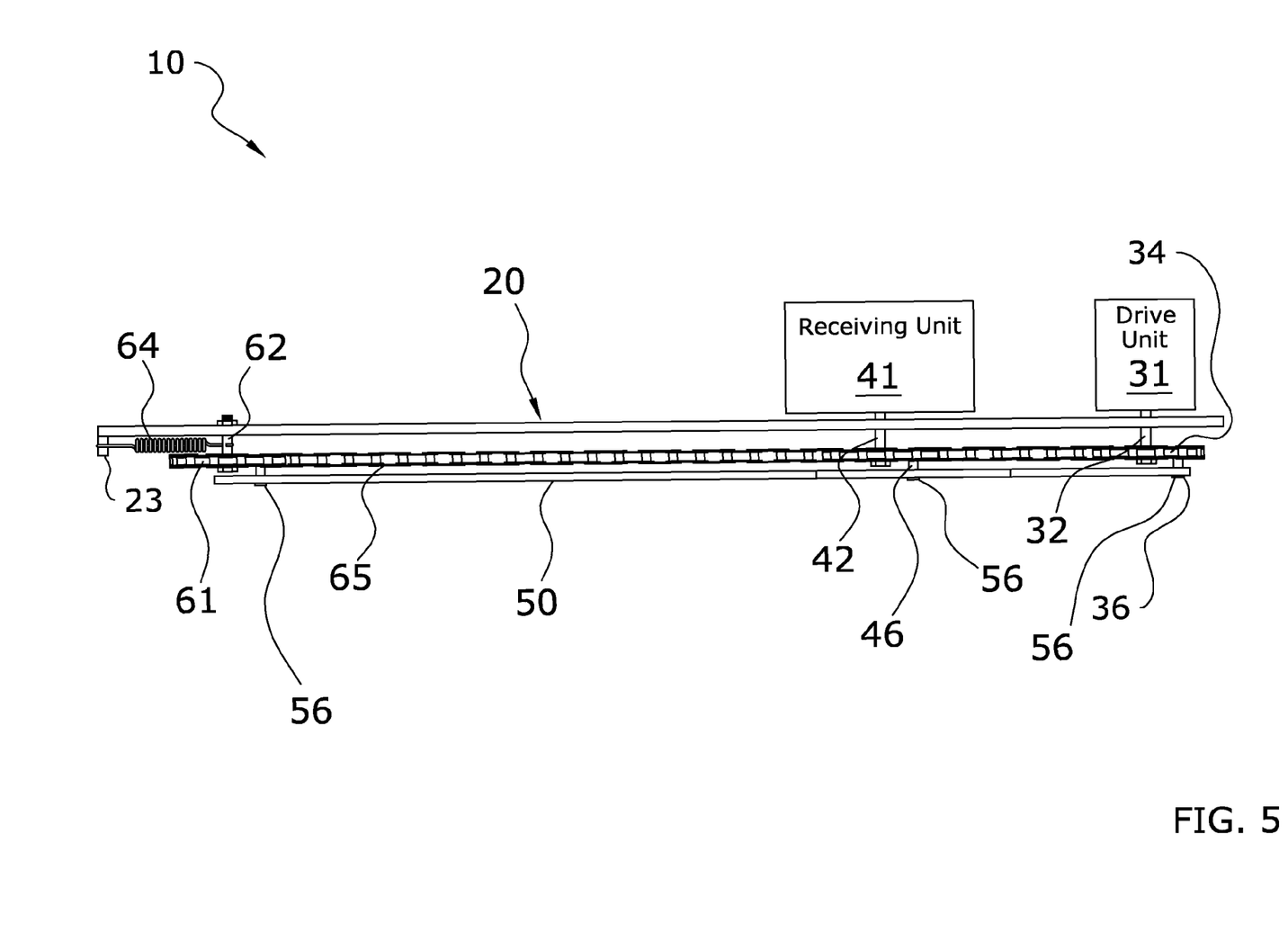
FIG. 5 is a top view of the present invention including the drive unit and the receiving unit attached to the first rotating member and the second rotating member respectively

The connecting arm 50 is also perpendicular to a rotational axis of the rotating members 33, 43 and the shafts 32, 42, wherein the connecting arm 50 utilizes a horizontal leverage as illustrated in FIGS. 2 and 3. The connecting arm 50 is further preferably parallel to the support structure 20 to allow the support structure 20 to provide the maximum support and stabilization for the connecting arm 50.

The connecting arm 50 is also attached to the first rotating member 33 and the second rotating member 43 in a manner so as to be in a position (with respect to the radial path of the connecting arm 50 about the rotating member 33, 43) to deliver the least amount of force (i.e. in negative 13 or neutral zone 14) when the drive unit 31 is currently delivering a maximum amount of force (i.e. positive zone 12). Likewise the connecting arm 50 is in a position (about the radial path of the connecting arm 50) to deliver a maximum amount of force (i.e. in the positive zone 12) when the drive unit 31 is delivering the least amount of force during the drive unit's 31 cycle (i.e. negative 13 or neutral zone 14). The connecting arm 50 is further preferably positioned opposite the power stroke of the drive unit 31 to maintain a substantially continuous force transferred to the second assembly 40 from the first assembly 30 (as illustrated by reference line 16 on FIGS. 6 through 8).

Figure 6:
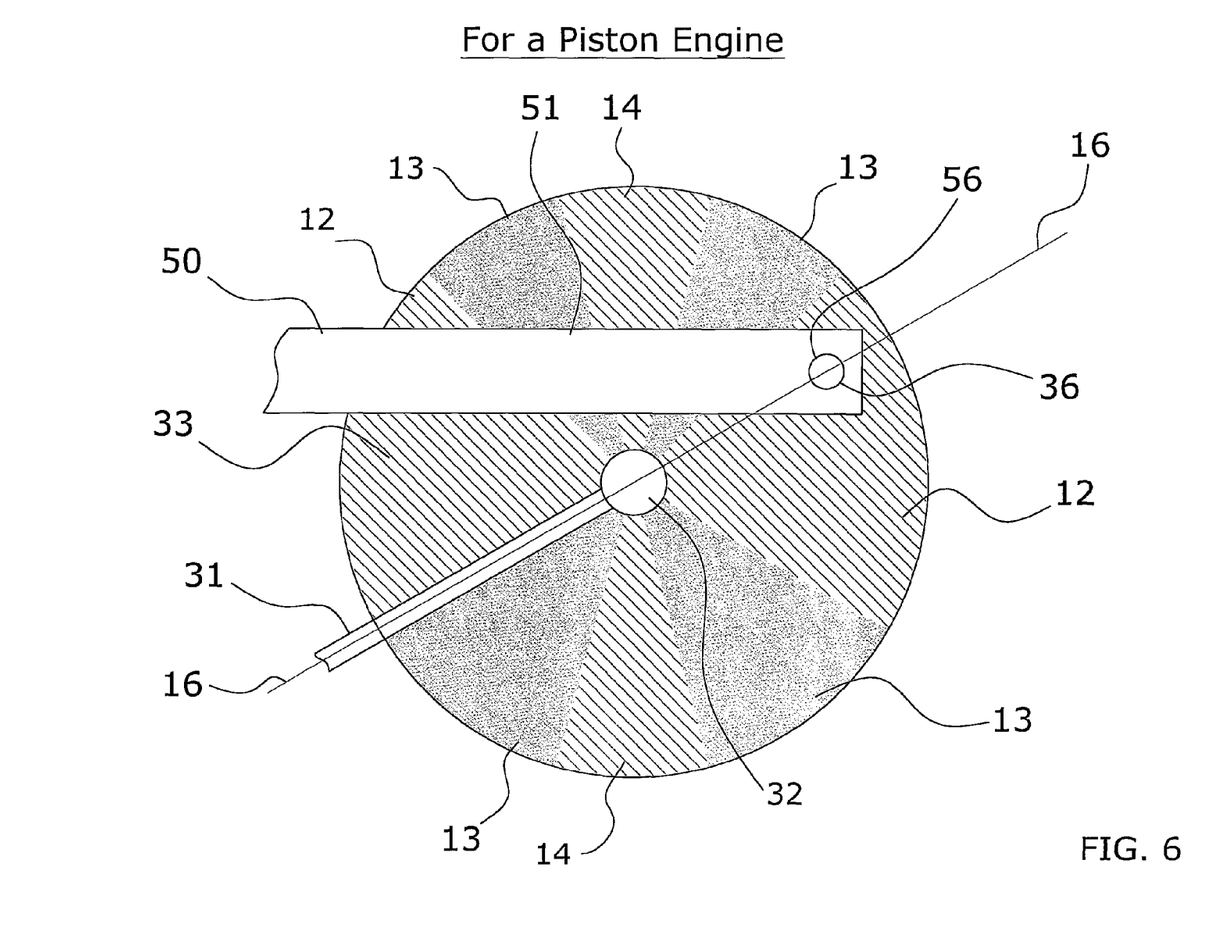
FIG. 6 is a side view of the rotating member in use upon a piston engine illustrating the positioning of the connecting arm and the drive unit with respect to the rotating member with the connecting arm in a first position.

For example, when the pedal 31 of a bicycle is being pushed downwards in the positive zone 12 (i.e. maximum force being delivered) the connecting arm 50 is positioned prior to the pedal 31 in the rotation of the pedal 31 (i.e. negative zone 13, neutral zone 14) as illustrated in FIG. 6. Likewise when the pedal 31 is within the negative 13 or neutral zones 14 (i.e. least amount of force being delivered) the connecting arm 50 is rotating within the positive zone 12 as illustrated in FIG. 7.

Figure 7:
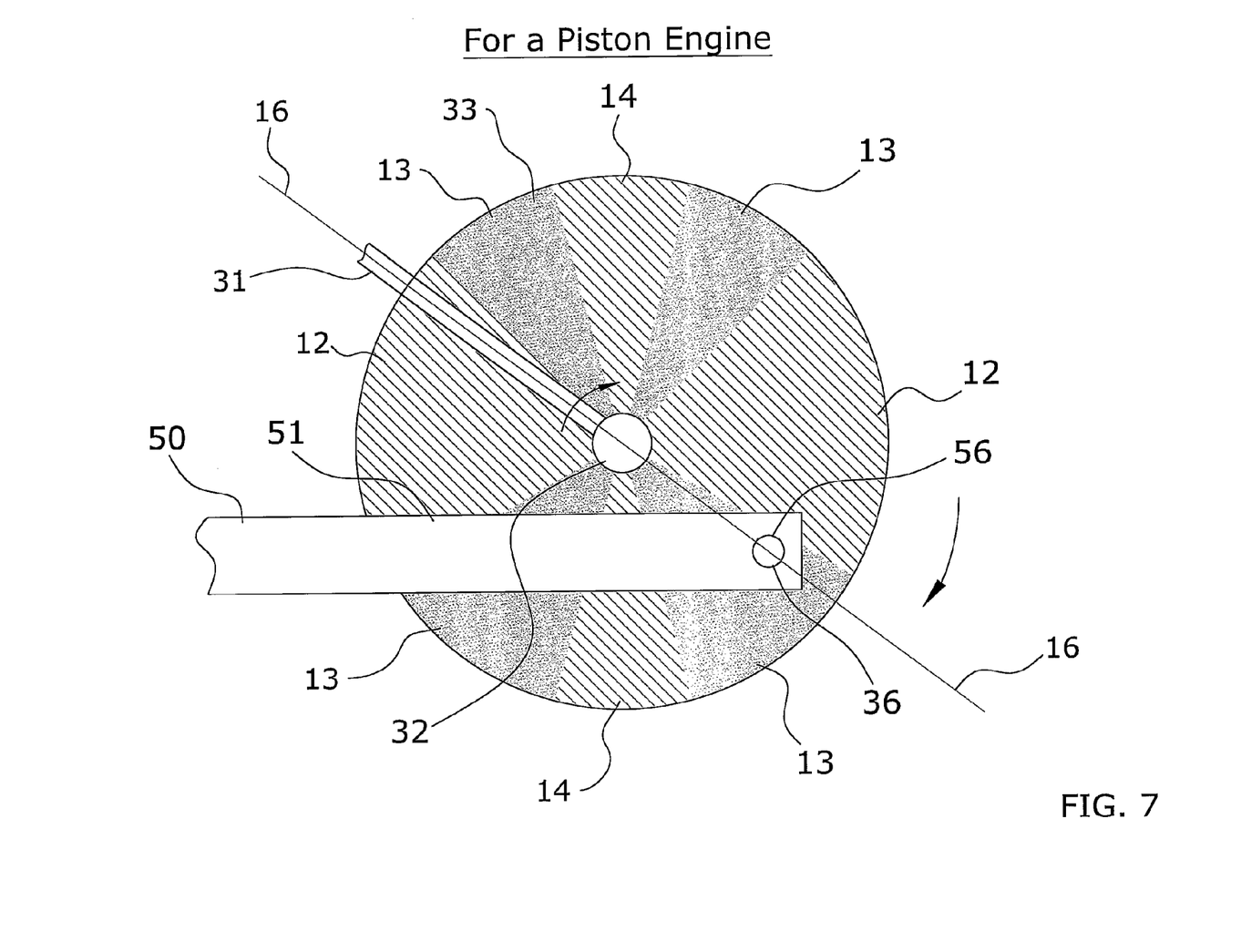
FIG. 7 is a side view of the rotating member in use upon a piston engine illustrating the positioning of the connecting arm and the drive unit with respect to the rotating member with the connecting arm in a second position.
Figure 8:
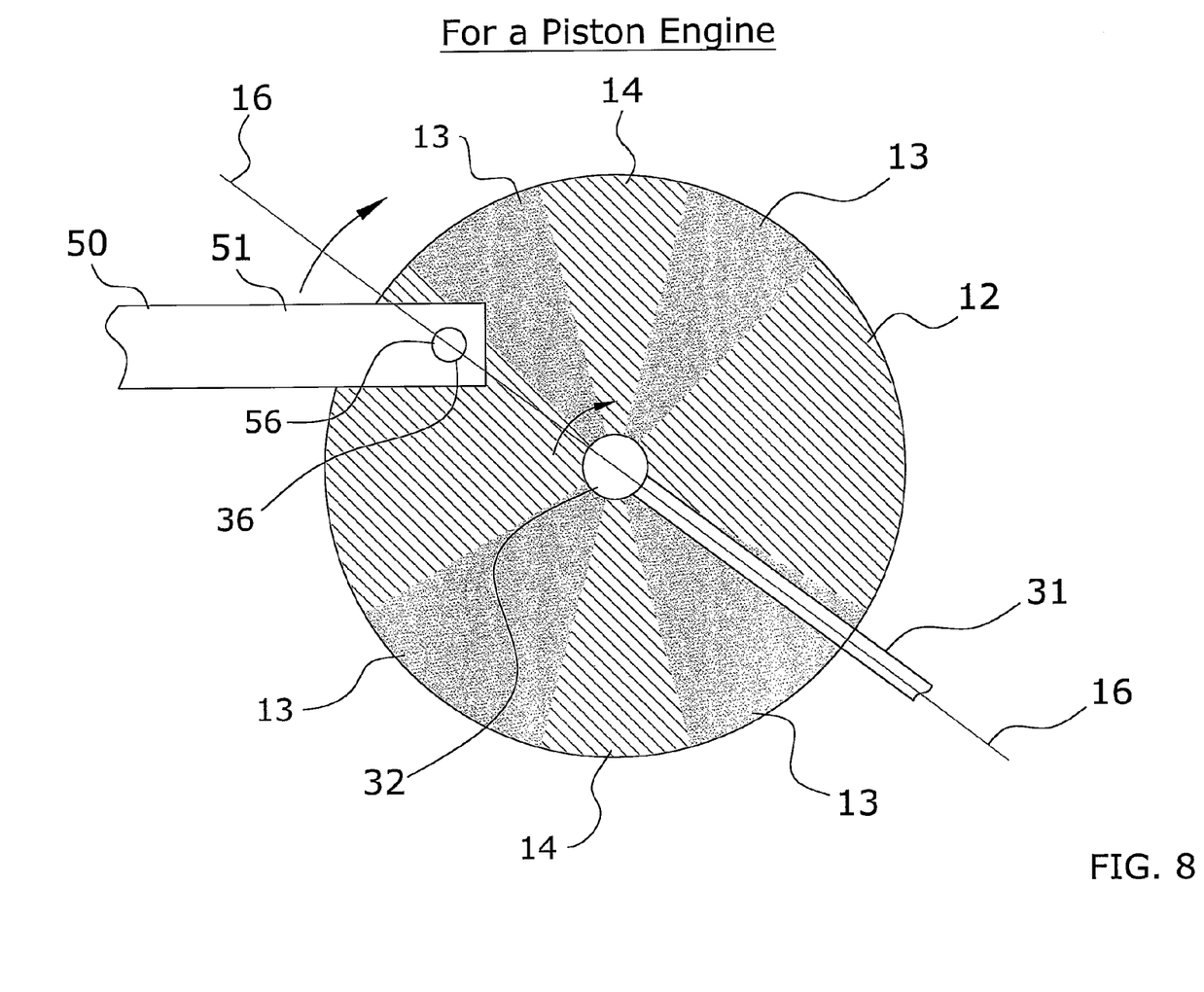
FIG. 8 is a side view of the rotating member in use upon a piston engine illustrating the positioning of the connecting arm and the drive unit with respect to the rotating member with the connecting arm in a third position.

It is appreciated that the positive 12, negative 13 and neutral 14 zones illustrated in FIGS. 6 and 7 are illustrative of the areas within the rotation of the rotating members 33, 43 where differing forces are commonly exerted. For example, the positive zone 12 may relate to the power stroke of an engine 31 and the negative 13 or neutral 14 zones may relate to the intake, compression or exhaust strokes of the engine 31. In another embodiment, the positive zone 12 may relate to the duration when a bicyclist is able to exert a maximum rotational force (i.e. pushing downwards) and the negative 13 or neutral 14 zones may be positioned prior or after the positive zone 12.

The connecting arm 50 may also include a plurality of stabilizing members 54 as illustrated in FIGS. 1 through 4. The stabilizing members 54 preferably longitudinally extend along opposing sides of the connecting arm 50 to help maintain the connecting arm 50 in a straight configuration and prevent the connecting arm 50 from wobbling or bending. In the preferred embodiment, the stabilizing members 54 are comprised of an I-shaped cross-sectional shape (similar to an I-beam); however it is appreciated that the stabilizing members 54 may be comprised of various configurations rather than the preferred embodiment. The stabilizing members 54 are further preferably positioned adjacent the second rotating member 43.

Figure 1:
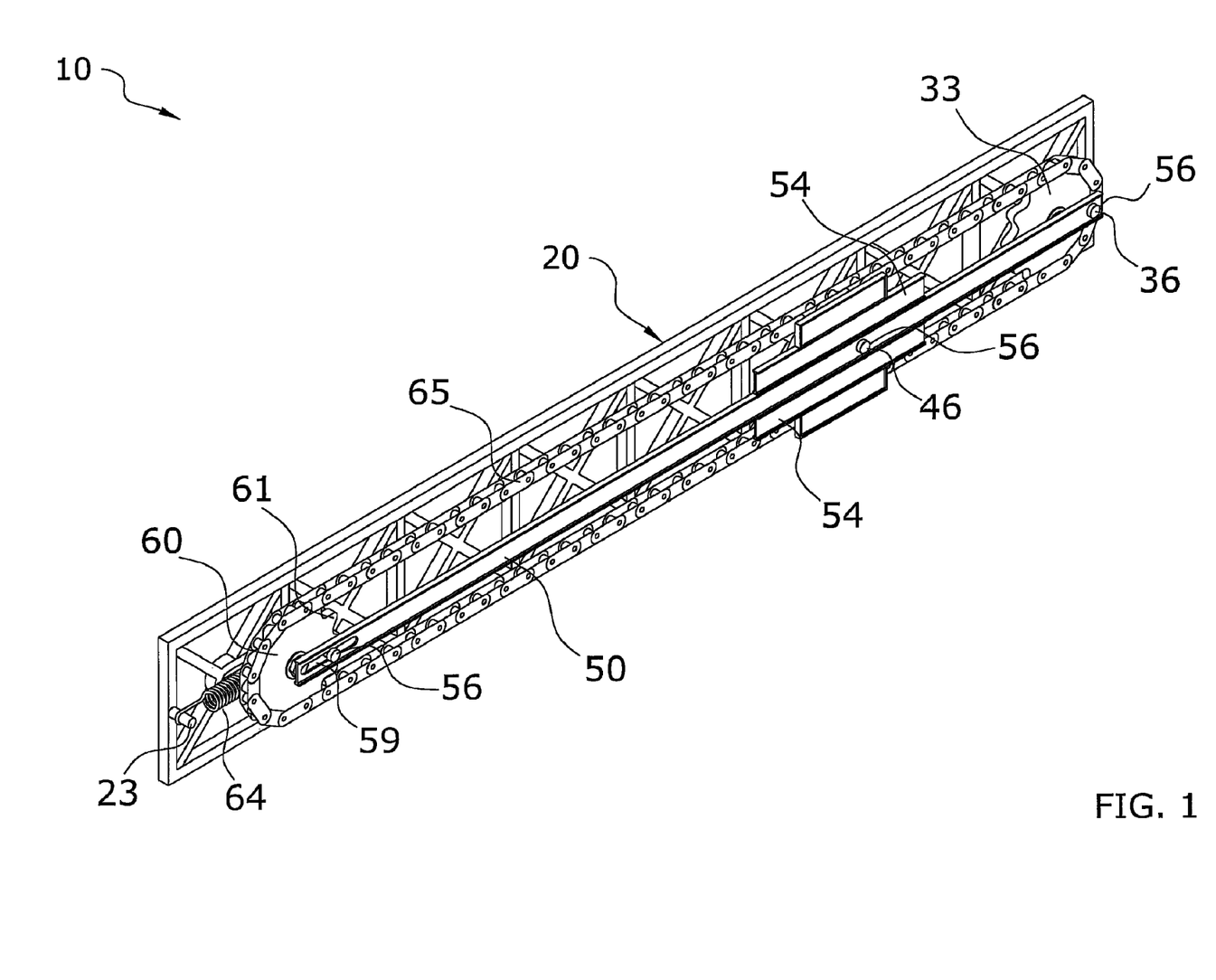
FIG. 1 is an upper perspective view of the present invention.

The connecting arm 50 may further include a second slot 59 longitudinally extending along the connecting arm 50 adjacent the second end 52 as illustrated in FIGS. 1 through 3. The second slot 59 allows the connecting arm 50 to slidably adjust about the fastener 56 if the connecting arm 50 is desired to be slid toward or away from the first rotating member 33.

F. Third Rotating Member and Connecting Components

The present invention may also include a third rotating member 60 rotatably attached to the support structure 20 (via a shaft 62) at a distal end opposite the first rotating member 33. The third rotating member 60 helps to stabilize the first rotating member 33. The third rotating member 60 may include a plurality of outer teeth 61, wherein the third rotating member 60 is comprised of a sprocket. The first rotating member 33 and the third rotating member 60 are preferably comprised of substantially similar configurations and include an equal number of teeth 34, 61 to maintain the connecting arm 50 in the proper phase with respect to the rotating members 33, 43.

The third rotating member 60 is preferably attached to the first rotating member 33 via an elongated member 65 as illustrated in FIGS. 1 through 5. In the preferred embodiment, the elongated member 65 is comprised of a chain configuration; however it is appreciated that the elongated member 65 may be comprised of various other configurations rather than the preferred embodiment. The third rotating member 60 is also preferably slidably adjustable upon the support structure 20, wherein the third rotating member 60 slidably adjusts in a parallel manner with respect to the connecting arm 50. The third rotating member 60 further slidably adjusts within a first slot 25 of the support structure 20, wherein the first slot 25 is aligned with the second slot 59.

The third rotating member 60 slidably adjusts to maintain the elongated member 65 in a taut configuration. A spring 64 may be attached between the third elongated member 65 and an extension member 23 of the support structure 20, wherein the spring 64 continually pulls on the third rotating member 60 away from the first rotating member 33 to maintain the elongated member 65 in a taut configuration.

Figure 9:
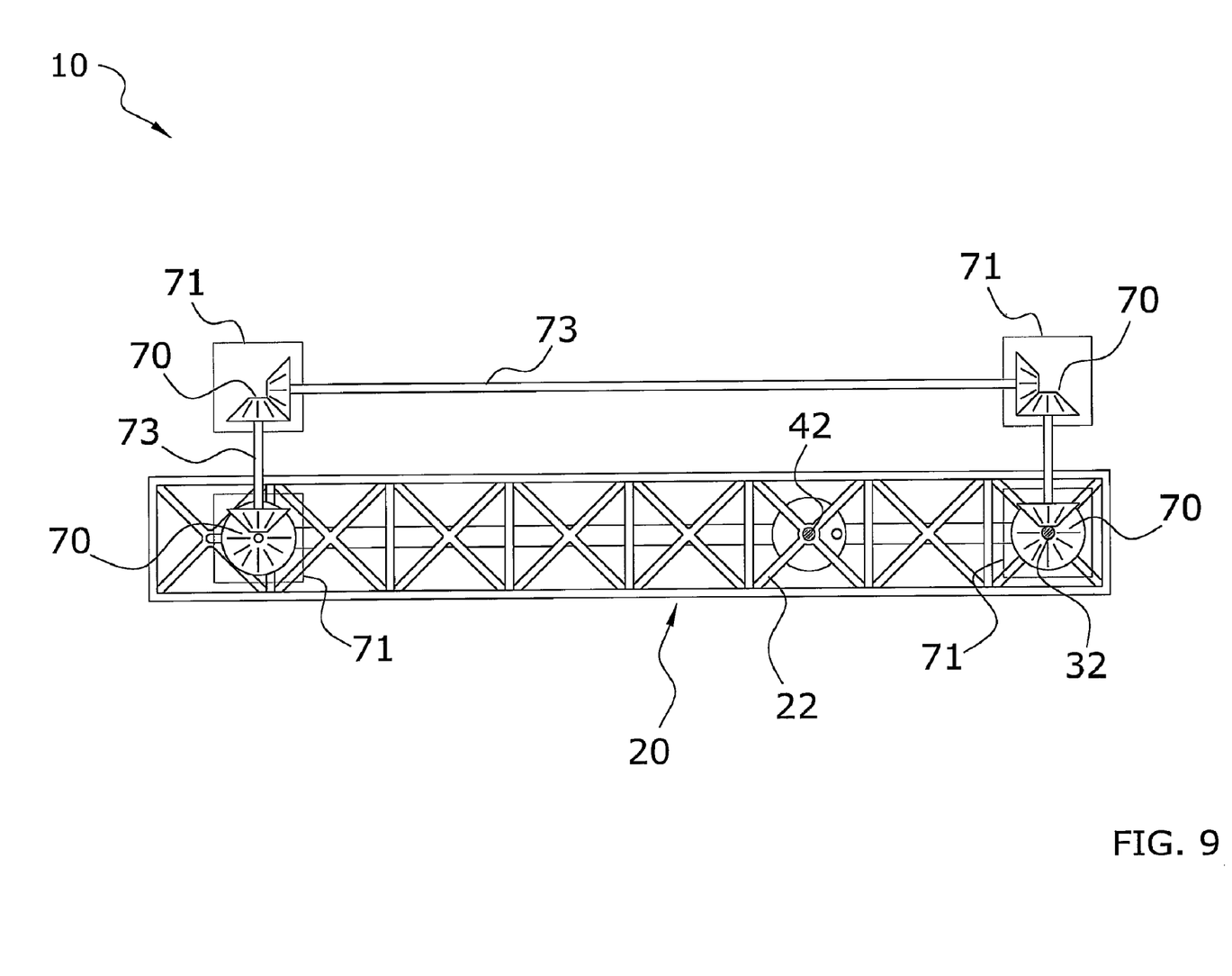
FIG. 9 is a side view of another alternate embodiment of the present invention, wherein a gear and shaft structure is utilized rather than the elongated member to connect the first rotating member to the third rotating member.

In an alternate configuration of attaching the first rotating member 33 to the third rotating member 60, a plurality of connecting gears 70 and connecting shafts 73 may rotatably connect the first rotating member 33 to the third rotating member 60. The connecting gears 70 are preferably comprised of a beveled gear configuration as illustrated in FIG. 9. The connecting gears 70 are also preferably positioned within a plurality of separately formed gear boxes 71 to prevent dust, dirt or other contaminants from contacting the connecting gears 70. The connecting gears 70 may include a lubricant (e.g. oil, etc.) upon an outer surface within the gear box 71.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A torque transfer device, comprising:
   a support structure;
   a first rotating member having an input shaft concentric with said first rotating member, wherein said first rotating member is rotatably attached to said support structure via said input shaft;
   a drive unit rotationally coupled to said input shaft opposite said first rotating member along said input shaft for transferring a first rotational force to said input shaft;
   a second rotating member having an output shaft concentric with said second rotating member, wherein said second rotating member is rotatably attached to said support structure via said output shaft;
   a receiving unit rotationally coupled to said output shaft opposite said second rotating member along said output shaft for receiving a second rotational force of said output shaft;
   a connecting arm directly attached to said first rotating member at a first attachment point of and said second rotating member at a second attachment point;
   wherein said first attachment point is offset from a first rotational axis of said input shaft of said first rotating member and wherein said second attachment point is offset from a second rotational axis of said output shaft of said second rotating member; and
   a third rotating member rotatably coupled to said first rotating member via an elongated member, wherein said third rotating member is rotatably connected to said support structure;
   wherein said elongated member is comprised of a chain;
   wherein said third rotating member is connected to said connecting arm, wherein said connecting arm is comprised of a rigid and straight structure.

2. The torque transfer device of claim 1, wherein a longitudinal axis of said connecting arm is perpendicular to said first rotational axis and said second rotational axis.

3. A torque transfer device, comprising:
   a drive unit;
   a first rotating member rotatably attached to said drive unit, wherein said drive unit rotates said first rotating member;
   wherein said first rotating member has a plurality of teeth circumscribing said first rotating member;
   a receiving unit;
   a second rotating member rotatably attached to said receiving unit;
   a third rotating member having a plurality of teeth circumscribing said third rotating member;
   a connecting arm attached to said first rotating member at a first attachment point, said second rotating member at a second attachment point, and said third rotating member at a third attachment point;
   wherein said second attachment point is between said first attachment point and said third attachment point along a linear length of said connecting arm;
   wherein said first attachment point is offset from a first rotational axis of said first rotating member, wherein said second attachment point is offset from a second rotational axis of said second rotating member, and wherein said third attachment point is offset from a third rotational axis of said third rotating member; and
   a chain connecting said first rotating member and said third rotating member via said plurality of teeth of said first rotating member and said plurality of teeth of said third rotating member.

4. The torque transfer device of claim 3, wherein said first rotational axis is concentric with said first rotating member and wherein said second rotational axis is concentric with said second rotating member.

5. The torque transfer device of claim 3, wherein a longitudinal axis of said connecting arm is perpendicular to said first rotational axis and said second rotational axis.

6. The torque transfer device of claim 1, wherein said third rotating member is slidably connected to said connecting arm.

7. The torque transfer device of claim 6, including a spring mechanically connecting said third rotating member to said support structure to provide a bias force upon said third rotating member relative said connecting arm.

* * * * *